C. T. RIDGELY.
DEMOUNTABLE HUB.
APPLICATION FILED SEPT. 13, 1915.

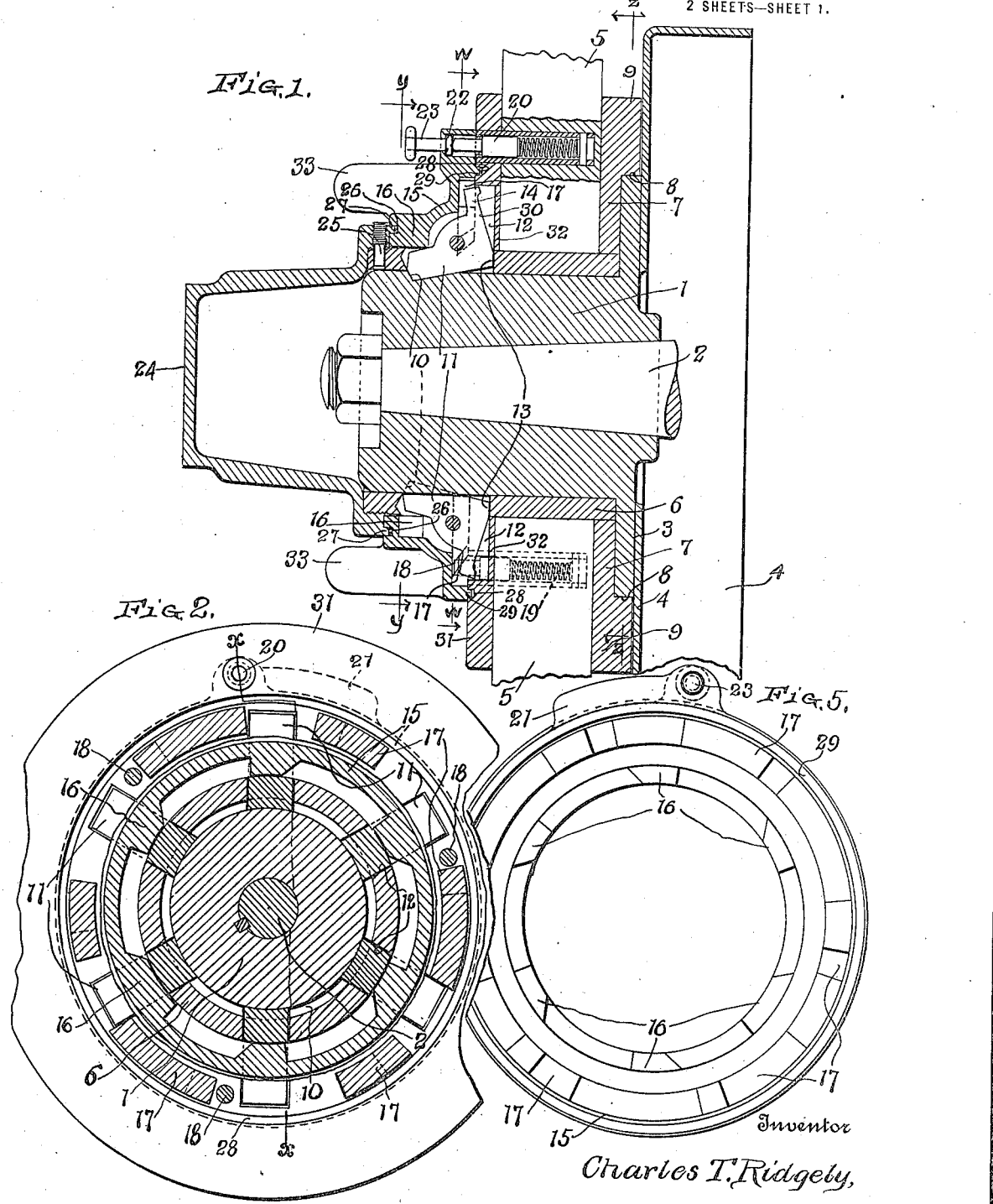

1,173,217.

Patented Feb. 29, 1916.
2 SHEETS—SHEET 2.

Inventor
Charles T. Ridgely,

By

Attorney

UNITED STATES PATENT OFFICE.

CHARLES T. RIDGELY, OF SPRINGFIELD, OHIO.

DEMOUNTABLE HUB.

1,173,217. Specification of Letters Patent. Patented Feb. 29, 1916.

Application filed September 13, 1915. Serial No. 50,327.

*To all whom it may concern:*

Be it known that I, CHARLES T. RIDGELY, a citizen of the United States, residing at Springfield, in the county of Clark and State of Ohio, have invented certain new and useful Improvements in Demountable Hubs, of which the following is a specification, reference being had therein to the accompanying drawing.

This invention relates to demountable hubs and is designed particularly for use in connection with automobile wheels, although its use is not limited to such wheels.

The present invention is in the nature of an improvement upon the device shown and described in the application for patent filed by me June 7th, 1915, Ser. No. 32,524.

Special reference is herein made to applicant's copending application filed Dec. 27, 1915, Ser. No. 68,658, in which certain of the detachable features, the stops and locking device, shown and described herein, are claimed.

The object of the present invention is to provide a device of this kind which can be very quickly and easily manipulated to release the outer hub from or secure the same to the inner hub; and which will be of a very strong durable character.

To this end it is a further object of the invention to provide the device with locking dogs adapted to be interposed between the inner and outer hubs and so arranged that they will transmit the thrust to solid portions of both hubs; and to so arrange the locking devices that they can be moved into their operative or inoperative positions by a very short movement of an actuating device.

A further object of the invention is to provide means for retaining the actuating member for the locking devices in a position to hold the locking devices in their locking positions until positive force has been applied to said actuating member, thus preventing the outer hub from being accidentally released.

It is also an object of the invention to so construct the device as to render the same dust proof.

Figure 3:
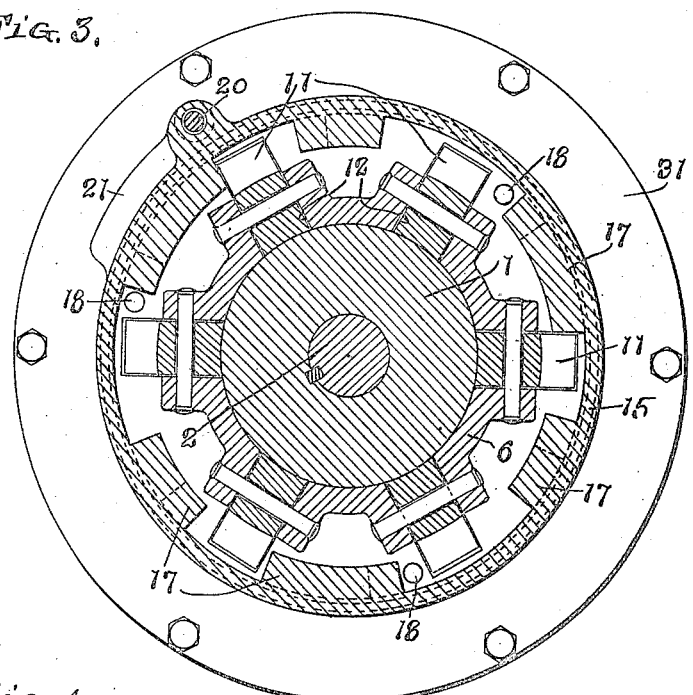
Figure 4:
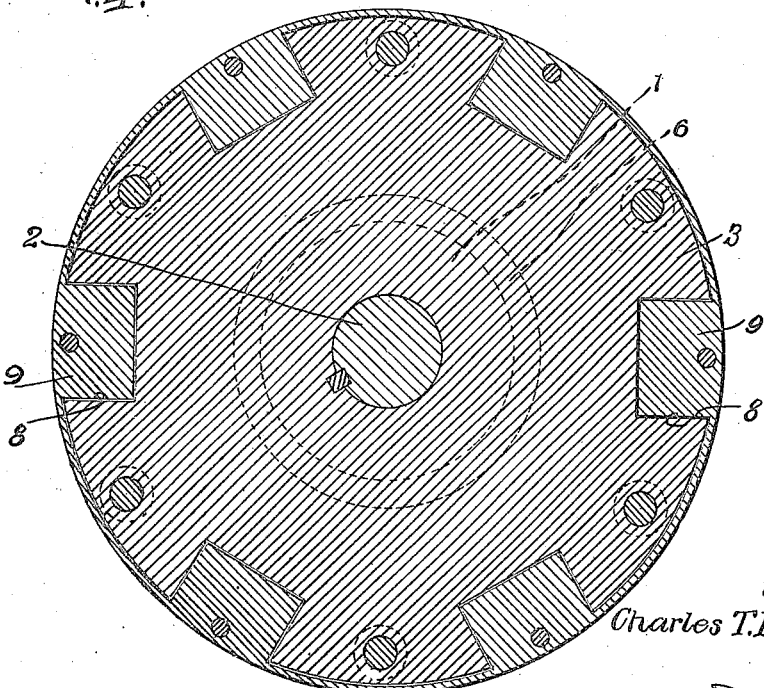

In the accompanying drawings, Figure 1 is a longitudinal, sectional view, taken through the hub of a wheel embodying my invention, on the line $x$ $x$ of Fig. 2; Fig. 2 is a transverse, sectional view, partially broken away, taken on the line $y$ $y$ of Fig. 1 and looking in the direction of the arrows; Fig. 3 is a transverse, sectional view taken on the line $w$ $w$ of Fig. 1; Fig. 4 is a transverse, sectional view taken on the line $z$ $z$ of Fig. 1; and Fig. 5 is a plan view of the inside of the actuating collar.

In these drawings I have illustrated one embodiment of my invention and have shown the same as applied to an automobile wheel, the main features of construction of which are well known. The main hub 1 is mounted upon the spindle 2 of the axle in the usual manner and is provided with a flange 3 to which, in the case of the driving wheel, is rigidly secured a brake drum 4. The wheel further comprises spokes 5 which are mounted upon a supplemental hub 6 and are provided at their outer ends with the usual rim to receive a tire which, however, is not here shown. The outer or supplemental hub 6 is adapted to fit snugly about the main hub 1 and to slide onto and off of the same. This supplemental hub is also provided with an annular flange or plate 7 arranged adjacent to the plate 3 of the main hub, and the plates or flanges 3 and 7 are provided with interlocking recesses 8 and projections 9 to form a rigid driving connection between the inner and outer hubs when these are in their assembled positions. The inner or main hub 1 is provided with an annular shoulder 10 which is, in the present instance, formed by forming a circumferential groove in the outer surface of the inner hub. Pivotally mounted upon the outer hub are a series of locking devices or dogs 11 which, in the present construction, are mounted in recesses 12 formed in the outer hub at intervals about its circumference. The axes of these dogs are so arranged that the dogs may be moved into positions to engage the shoulder 10 and thus prevent the removal of the outer hub or the inner hub or they may be moved into such positions that their inner edges will lie flush with the inner surface of the outer or supplemental hub, thus permitting the latter to be removed from the inner hub. Further, the axes of the dogs are so arranged that when they are in their locking position the inner corners thereof will bear against the adjacent walls of the respective recesses, the corners of the dogs being slightly beveled, as shown at 13, to give a firm bearing. Thus, the body of the dog forms a rigid connection between the shoulder of the inner hub and the body of the outer hub and the pivot pins are relieved of all strain, thereby providing a construction of great strength and durability.

An actuating device is provided for positively moving the dogs into and out of their locking positions and this device is preferably rotatably mounted and is of such a character that a very short movement will suffice to actuate the dogs. To this end it is provided with a pair of cams adapted to act upon different portions of each dog, the one cam serving to move the dog in one direction about its axis, and the other cam, which engages the dog when the actuating device is moved in the opposite direction, serving to move the dog in the other direction about its axis. The construction of the dog and the arrangement of the cams may take various forms but, as here shown, the body of the dog 11 is provided with a projection or tail 14 extending at substantially right angles to the face of the dog. The actuating device is shown as a collar 15 rotatably mounted upon the outer hub and having two annular surfaces arranged at right angles one to the other. Each of these surfaces is provided with a plurality of cam-shaped portions, each surface having one cam-shaped portion for each dog. One of the annular surfaces of the locking device is arranged substantially parallel with the axis of the hub and is provided with a series of cams 16 spaced apart to permit the ends of the body portions of the dogs to be moved out of engagement with the shoulder of the inner hub and further adapted to engage the ends of the respective dogs when rotary movement is imparted to the actuating device or collar 15 and force the dogs into the groove in the inner hub and into positions to engage the shoulder 10, the forward ends of the cams 16 being beveled to facilitate their engagement with the dogs. The second annular surface of the locking device is arranged at substantially right angles to the axis of the hub and it also has a series of cams corresponding in number to the number of dogs and arranged to engage the projections 14 of the dogs to move the body portions of the dogs into their inoperative positions. These latter cams, as shown at 17, are so arranged with relation to the cams 16 that when the latter are in engagement with their respective dogs the cams 17 will be out of engagement therewith and when the cams 16 are moved out of engagement with the dogs the cams 17 will engage the latter and move the same into their inoperative positions. Obviously, a very short movement of the actuating device will suffice to operate the dogs.

Means are provided to prevent the accidental movement of the locking device in a direction to move the dogs into their inoperative positions and thus release the outer hub. This means preferably comprises a plurality of yieldable stops which are arranged between the inoperative positions of a part of the cams 17 and the corresponding dogs 11. In the present instance there are three of these yieldable devices and each comprises a pin 18 mounted in the body of the hub or in the hub and the spoke, as the case may be, and having a spring 19 pressing the same outward. The ends of the pins 18 are arranged in the paths of the beveled ends of the adjacent cams 17 and the springs 19 are of sufficient strength to prevent the movement of the actuating device until positive force is applied thereto, but when such force is applied to the actuating device the springs will yield and permit the pins to be forced into their recesses out of the paths of the cams. So long as the actuating device is in a position to hold the dogs in their inoperative positions the yieldable detents or pins 18 will be held in their retracted positions, but as soon as the actuating device is moved into such a position as to move the dogs into their locking positions the detents again move outward into their operative positions. In order that the detents may be retained in their inoperative positions when the dogs are in their inoperative positions the cams 17 which operate the detents are slightly elongated, so that they will not be moved past the detents. While the yieldable detents would under all ordinary conditions prevent movement of the actuating device I prefer to also provide a positive lock which will prevent the movement of the actuating device even though it should come in contact with some object which would exert pressure thereon in a direction to rotate the same. For this purpose I have mounted in the outer hub a yieldable detent or spring-pressed pin 20 similar to the yieldable detents above described and have provided the actuating device with an elongated projection 21 having at one end a socket or recess 22 arranged to receive the pin 20 when the dogs are in their locking positions and thus positively lock the actuating device against movement. To enable this detent 20 to be readily actuated to release the actuating device when it is desired to remove the outer hub a plunger 23 is mounted in the socket or recess 22 so that it can be actuated by the thumb to press the detent 20 out of the socket 22, thereby releasing the actuating device from this detent. It will be noted that the three cams 17 which actuate the spring-pressed pins or detents are of such a length that when the collar is rotated in a direction to cause the cams 16 to move the dogs into their operative positions the rear ends of these three long cams, 17, will strike the projections from the adjacent dogs and thus positively limit the rotation of the collar so that there is no possibility of the cams 16 being moved past the respective dogs. One or more of the cams 16 is also elongated so that when the dogs have been moved into their inoperative positions the rear end of this elongated cam, 16, will engage the adjacent dog and check the movement of the collar before any of the cams 17 can be carried past their respective dogs. In this manner the movement of the collar is positively limited so that it is impossible to move the same far enough in either direction to again release the dogs after they have been once operated.

The outer end of the hub is closed by a hub cap 24 which is screw-threaded onto the end of the outer hub 6 and is held against accidental displacement by a set screw 25. The actuating device is provided with an annular groove 26 adapted to receive an annular projection 27 on the inner edge of the hub cap 24 which serves to hold the actuating device rotatably in position and also renders the joint practically dust proof. By putting a little hard grease in the base of the groove 26 the joint can be made absolutely dust proof. A similar joint is provided at the other edge of the actuating device where the hub plate is provided with an annular groove 28 and the actuating device with an annular projection or rib 29 entering the groove. This construction forms a very strong and yet dust and water proof connection between the actuating device and the hub and further enables the actuating device to be very quickly and easily removed when desired by first removing the hub cap 24. In order that the movement of the dogs into their inoperative positions may not be interfered with by any foreign matter which might enter the recesses 12 I prefer to cut away the inner sides of the projections 14 of the dogs, as shown at 30, so that the tip ends only of these projections will engage the walls of the recesses. Consequently, any sand or foreign matter which may enter the recesses will not prevent the dogs from moving into their inoperative positions. It will further be noted that the outer face of the wheel is provided with a plate 31 which is secured to the spokes of the wheel and forms part of the spoke sockets. The recesses 12 are formed in this plate, as well as in the inner hub proper 6 and I prefer to cut the recesses 12 through the thickness of the plate, then countersink the plate between the recesses and mount thereon a thin backing plate 32 which forms the back walls of the recesses 12.

Rotary or operative movement may be imparted to the actuating device or collar 15 in any suitable manner, but for convenience of operation I have provided the same with two outwardly extending lugs or finger pieces 33 which can be grasped by the hand of the operator and the actuating device rotated in either direction.

The operation of the device will be readily understood from the foregoing description and it will be apparent that I have provided a demountable hub which is very simple in its construction and operation and is of a very strong and durable character; that the locking devices can be operated without the use of tools of any kind; and that a very short movement of the actuating device will operate the locking dogs and either release or fasten the outer hub to the inner hub, thus enabling the wheel to be very quickly changed. By carrying a spare wheel on a dummy hub properly placed on the machine, it is possible with this device to remove a wheel from the machine and substitute the spare wheel therefor in a remarkably short space of time. Further, the construction of the device, and particularly the construction and mounting of the actuating device or collar, are such as to not only effectually prevent dust and moisture from entering the hub from the outside but also to prevent grease which may be contained within the hub or hub cap from working its way through the joints to the exterior of the hub. It will also be noted that the locking devices or dogs are so arranged as to have a strong firm bearing at one end against the walls of the respective recesses and at the other ends against the shoulder, the shoulder and the adjacent ends of the dog being cut along substantially the same radius to provide a long bearing contact between these parts. Further, it will be apparent that the device is so constructed that it can be quickly and easily assembled; and that ample means are provided to prevent the accidental displacement of the hub.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. In a wheel, a main hub and a supplemental hub, one of said hubs having a shoulder, a locking device mounted on the other of said hubs, an actuating device mounted on one of said hubs and having means thereon adapted to be moved into and out of engagement with said locking device when rotated, and means to prevent axial movement of said actuating device during the rotation thereof.

2. In a wheel, a main hub, and a supplemental hub, one of said hubs having a shoulder, a locking device mounted on the other of said hubs, an actuating device rotatably mounted on one of said hubs and having a cam surface arranged to be moved into and out of engagement with said locking device, and a yieldable stop mounted on one of said hubs and extending into the path of said cam surface.

3. In a wheel, a main hub having a shoulder, a supplemental hub removably mounted on said main hub, a locking device pivotally mounted on said supplemental hub, having a part movable into and out of locking position with relation to said shoulder and having a part extending at an angle to the first-mentioned part, and a rotatable actuating device having two circumferential parts each provided with a cam surface, said cam surfaces being so arranged that when said actuating device is rotated in one direction, the cam surface of one of said parts will engage the body portion of said locking device and move the latter about its axis and when said actuating device is rotated in the other direction the cam surface of the other part thereof will engage the projection of said locking device and move the latter in the other direction about its axis.

4. In a wheel, a main hub having a shoulder, a supplemental hub removably mounted on said main hub, a locking device pivotally mounted on said supplemental hub, having a part movable into and out of locking position with relation to said shoulder and having a part extending at an angle to the first-mentioned part, and a rotatable actuating device having two circumferential parts each provided with a cam surface, said cam surfaces being so arranged that when said actuating device is rotated in one direction, the cam surface of one of said parts will engage the body portion of said locking device and move the latter about its axis and when said actuating device is rotated in the other direction the cam surface of the other part thereof will engage the projection of said locking device and move the latter in the other direction about its axis, and a yieldable detent arranged between the cam surface of the last-mentioned part of said actuating device and the projection of said locking device.

5. In a wheel, a main hub having a circumferential shoulder, a supplemental hub removably mounted on said main hub, a plurality of locking devices pivotally mounted on said supplemental hub and adapted to be moved into locking positions relatively to said shoulder, each of said locking devices having a projection extending at an angle to the body portion thereof, an actuating device rotatably mounted on said supplemental hub and having a series of cams arranged adjacent to the respective locking devices, said actuating device also having a second series of cams arranged adjacent to the projections of the respective locking devices, the last-mentioned series of cams being so arranged with relation to the cams of the first-mentioned series that they will engage said locking device after the cams of the first-mentioned series have been moved out of engagement therewith.

6. In a wheel, a main hub having a shoulder, a supplemental hub removably mounted on said main hub, a plurality of dogs mounted on said supplemental hub, each comprising a body portion adapted to be moved into locking relation to said shoulder, a projection extending at an angle to the length of said body portion, a collar rotatably mounted on said supplemental hub and comprising a circular portion arranged about said supplemental hub and having a series of cam surfaces adjacent to the body portions of the respective dogs, said collar also having a second part with its face arranged in a plane at substantially right angles to the axis of said hub, said second part being provided with a series of cam surfaces arranged adjacent to the projections of said dogs, the cams of one series being so arranged that they will be moved into engagement with the respective dogs when the cams of the other series are moved out of engagement therewith.

7. In a wheel, a main hub having a shoulder, a supplemental hub removably mounted on said main hub, a dog pivotally mounted on said supplemental hub and having a part movable into and out of locking relation with said shoulder, an actuating collar rotatably mounted on said supplemental hub, and a hub cap screwed onto the outer end of said supplemental hub and bearing against said collar to retain the same in operative position on said supplemental hub.

8. In a wheel, a main hub having a shoulder, a supplemental hub removably mounted on said main hub, a dog pivotally mounted on said supplemental hub and having a part movable into and out of locking relation with said shoulder, an actuating collar rotatably mounted on said supplemental hub, and a hub cap screwed onto the outer end of said supplemental hub and bearing against said collar to retain the same in operative position on said supplemental hub, one of said parts having a circumferential groove and the other of said parts having a circumferential rib arranged to enter said groove when the parts are in their assembled positions.

9. In a wheel, a main hub having a shoulder, a supplemental hub removably mounted on said main hub, a face plate secured to the outer side of said wheel and fitting snugly about said supplemental hub, a recess formed in said hub and said plate, a locking dog pivotally mounted in said recess and movable into and out of operative relation with said shoulder, an actuating collar rotatably mounted on said supplemental hub and having a part bearing against said face plate beyond the recess therein, whereby said collar will inclose said dog, and a cap screwed onto said supplemental hub and bearing against said collar to hold the same in engagement with said face plate.

10. In a wheel, a main hub having a shoulder, a supplemental hub removably mounted on said main hub, a face plate secured to the outer side of said wheel and fitting about said supplemental hub, said hub and said face plate having a series of recesses therein, dogs pivotally mounted in said recesses, a collar rotatably mounted on said supplemental hub for actuating said dog and having a part engaging said plate beyond the outer ends of said recesses, said plate and said collar having interlocking parts, and a cap screw-threaded onto said supplemental hub and engaging said collar to hold the same in engagement with said face plate, said collar and said cap having interlocking parts.

11. In a wheel, a main hub having a shoulder, a supplemental hub removably mounted on said main hub, a face plate secured to said wheel and fitting snugly about said supplemental hub, said supplemental hub having a series of openings therein and said face plate having a series of openings formed therein adjacent to the openings in said supplemental hub, said face plate being countersunk on its inner side, and a backing plate fitted in the countersunk portion of said face plate to close the inner sides of the openings in said plate, dogs pivotally mounted in the respective openings in said supplemental hub and said face plate, and an actuating collar movably mounted on said supplemental hub for moving said dogs into and out of operative relation with the shoulder of said main hub.

12. In a wheel, a main hub having a shoulder, a supplemental hub removably mounted on said main hub, a dog mounted on said supplemental hub and movable into and out of operative relation to said shoulder, an actuating device rotatably mounted on said supplemental hub and having cam surfaces to engage said dog and actuate the same, a yieldable detent arranged in the path of one of said cams to hold said actuating device against rotation in a direction to move said dog into its inoperative position, a positive stop to prevent the rotation of said actuating device in a direction to move said dog into its inoperative position, and manually operated means for moving said last-mentioned stop into its inoperative position.

13. In a wheel, a main hub having a shoulder, a supplemental hub removably mounted in said main hub and having a recess, a locking device mounted in said recess and movable into and out of operative relation with said shoulder, said locking device being so arranged that when in locking position its opposite ends will simultaneously engage said shoulder and the wall of said recess, and an actuating device to move said locking device into and out of its locking position.

14. In a wheel, a main hub having a shoulder, a supplemental hub rotatably mounted on said main hub and having a recess, a locking dog pivotally mounted in said recess and so arranged that when one end is moved into engagement with said shoulder the other end will be moved into engagement with the wall of said recess, and a rotatable actuating device to positively move said locking dog into and out of its locking position.

15. In a wheel, a main hub, a supplemental hub, one of said hubs having a shoulder, the other of said hubs having a locking device, an actuating device having a cam surface adapted to be moved into and out of operative engagement with said locking device and having a stop arranged to engage a part of said locking device to limit the movement of said actuating device after the disengagement thereof.

16. In a wheel, a main hub, a supplemental hub, one of said hubs having a shoulder, a locking device mounted on the other of said hubs and movable into and out of engagement with said shoulder, an actuating device having a cam surface arranged to be moved into and out of operative engagement with said locking device, a yieldable pin located in the path of said actuating device and between said cam surface and said locking device, whereby when said actuating device is moved the cam surface thereof will first depress the said pin and then engage the said locking device.

17. In a wheel, a main hub, a supplemental hub, one of said hubs having a shoulder, a locking device mounted on the other of said hubs and movable into and out of engagement with said shoulder, an actuating device, said actuating device having a cam surface to move said locking device into engagement with said shoulder, said actuating device also having a cam surface to move said locking device out of engagement with said shoulder, and means to limit the movement of said actuating device in either direction.

18. In a wheel, a main hub, a supplemental hub, one of said hubs having a shoulder, the other of said hubs having a locking device movable into and out of engagement with said shoulder, an actuating device having cam surfaces, a portion of said cam surfaces being arranged to move said locking device into engagement with said shoulder when the actuating device is moved in one direction and another portion of said cam surfaces being arranged to move the said locking device out of engagement with said shoulder when the actuating device is moved in the opposite direction, and stops associated with said cam surfaces and arranged to engage portions of the locking device to limit the rotation of the actuating device in either direction.

19. In a wheel, a main hub, a supplemental hub, one of said hubs having a shoulder, a locking device mounted on the other side of said hubs and movable into and out of engagement with said shoulder, a rotatable actuating device mounted on one of said hubs and arranged to move said locking device into and out of engagement with said shoulder, and a hub cap screwed onto the outer end of the last mentioned of said hubs and bearing against said actuating device to retain the same in operative position on its hub.

20. In a wheel, a main hub, a supplemental hub removably mounted on said main hub, one of said hubs having a shoulder, the other of said hubs having a recess, a locking device mounted in said recess and movable into and out of operative relation with said shoulder, said locking device being so arranged that when in locking position its opposite ends will simultaneously engage said shoulder and the wall of said recess, and an actuating device to move said locking device into and out of its locking position.

21. In a wheel, a main hub, a supplemental hub removably mounted on said main hub, one of said hubs having a shoulder, the other of said hubs having locking devices mounted thereon movable into and out of engagement with said shoulder, a rotatable actuating device having cam surfaces arranged to move said locking devices into and out of engagement with said shoulder, and means to prevent the axial movement of said actuating device during the rotation thereof.

22. In a wheel, a main hub, a supplemental hub, one of said hubs having a shoulder, the other of said hubs having a locking device, an actuating device having a cam adapted to be moved into and out of operative engagement with said locking device, and a stop on said actuating device arranged to engage said locking device to limit the movements of said actuating device.

23. In a wheel, a main hub, a supplemental hub, one of said hubs having a shoulder, a rotatable member having a locking device adapted to be moved into and out of engagement with said shoulder, said rotatable member being mounted upon a hub, and a hub cap mounted on the outer end of the same hub and bearing against said rotatable member to retain the same in operative position on the hub.

24. In a wheel, a main hub having a shoulder, a supplemental hub removably mounted on said main hub, a face plate secured to the outer side of said wheel and encircling said supplemental hub, a locking device mounted on said supplemental hub and movable into and out of engagement with said shoulder, an actuating collar adapted to engage said locking device to operate the same and rotatably mounted on said supplemental hub and having a part bearing against said face plate, and means to retain said collar in engagement with said face plate.

25. In a wheel, a main hub, a supplemental hub, one of said hubs having a shoulder, the other of said hubs having a locking device, an actuating device having a cam adapted to be moved into and out of operative engagement with said locking device, and a stop on said actuating device arranged to engage said locking device to limit the movement of said actuating device to less than one complete revolution.

26. In a wheel, a main hub, a supplemental hub, one of said hubs having a shoulder, a locking device mounted on the other of said hubs and movable into and out of engagement with said shoulder, an actuating device, said actuating device having a cam surface to move said locking device into engagement with said shoulder, said actuating device also having a cam surface to move said locking device out of engagement with said shoulder, and means to limit the movement of said actuating device to less than one complete revolution in either direction.

In testimony whereof, I affix my signature.

CHARLES T. RIDGELY.

Copies of this patent may be obtained for five cents each, by addressing the "Commissioner of Patents, Washington, D. C."